United States Patent
Pettersson

(10) Patent No.: US 10,136,148 B2
(45) Date of Patent: Nov. 20, 2018

(54) METHODS, RECEIVING DEVICE AND SENDING DEVICE FOR MANAGING A PICTURE

(71) Applicant: Telefonaktiebolaget L M Ericsson (publ), Stockholm (SE)

(72) Inventor: Martin Pettersson, Vallentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 304 days.

(21) Appl. No.: 14/906,083

(22) PCT Filed: Dec. 22, 2015

(86) PCT No.: PCT/EP2015/080923
§ 371 (c)(1),
(2) Date: Jan. 19, 2016

(87) PCT Pub. No.: WO2016/184532
PCT Pub. Date: Nov. 24, 2016

(65) Prior Publication Data
US 2017/0111645 A1    Apr. 20, 2017

Related U.S. Application Data

(60) Provisional application No. 62/163,009, filed on May 18, 2015.

(51) Int. Cl.
*H04N 19/40*    (2014.01)
*H04N 19/86*    (2014.01)
*H04N 19/182*   (2014.01)

(52) U.S. Cl.
CPC .......... *H04N 19/40* (2014.11); *H04N 19/182* (2014.11); *H04N 19/86* (2014.11)

(58) Field of Classification Search
CPC ....... H04N 19/40; H04N 19/182; H04N 19/86

USPC ............................................ 375/240, 240.16
See application file for complete search history.

(56) References Cited

U.S. PATENT DOCUMENTS

| 2005/0141036 A1* | 6/2005 | Kakutani | ............. H04N 1/4074 |
| | | | 358/3.05 |
| 2005/0276496 A1* | 12/2005 | Molgaard | ............ H04N 19/105 |
| | | | 382/244 |

(Continued)

FOREIGN PATENT DOCUMENTS

| EP | 2 934 014 A1 | 10/2015 |
| WO | 2014/091984 A1 | 6/2014 |

OTHER PUBLICATIONS

Ho, Yo Sung and Allen Gersho, "Contour-Based Postprocessing of Coded Images," Visual Communications and Image Processing IV, SPIE vol. 1199, Nov. 8, 1989, XP000852904, pp. 1440-1449.

(Continued)

*Primary Examiner* — Andy Rao
*Assistant Examiner* — Zaihan Jiang
(74) *Attorney, Agent, or Firm* — Rothwell, Figg, Ernst & Manbeck, P.C.

(57) ABSTRACT

A method for managing a picture including pixels. In one aspect, a receiving device converts pixel values of the pixels represented with a first bitdepth into pixel values represented with a second bitdepth where the first bitdepth is smaller than the second bitdepth. The receiving device identifies a first group of pixels including a first pixel and a second pixel. The receiving device identifies a first and second edge pixel, derives a first and second pixel values based on the edge values of the first and second edge pixels, and estimates a first estimated pixel value for the first pixel based on the derived first pixel and second pixel value.

27 Claims, 6 Drawing Sheets

(56) References Cited

U.S. PATENT DOCUMENTS

| | | | |
|---|---|---|---|
| 2008/0018506 A1 | 1/2008 | Raveendran | |
| 2008/0123989 A1* | 5/2008 | Lin | G06T 5/002 |
| | | | 382/275 |
| 2009/0060375 A1 | 3/2009 | Lim et al. | |
| 2011/0135011 A1* | 6/2011 | Eddy | G06T 5/002 |
| | | | 375/240.29 |
| 2011/0199394 A1* | 8/2011 | Toraichi | G06T 3/403 |
| | | | 345/671 |
| 2012/0262475 A1* | 10/2012 | Frank | G09G 5/02 |
| | | | 345/597 |
| 2013/0259384 A1* | 10/2013 | Kwon | G06K 9/00375 |
| | | | 382/199 |
| 2014/0029846 A1* | 1/2014 | Su | G09G 3/2048 |
| | | | 382/166 |
| 2015/0379970 A1* | 12/2015 | Albrecht | G09G 5/393 |
| | | | 345/214 |
| 2016/0026859 A1* | 1/2016 | Chiba | G06K 9/342 |
| | | | 382/199 |
| 2016/0063964 A1* | 3/2016 | Verma | G09G 5/363 |
| | | | 345/582 |
| 2016/0307298 A1* | 10/2016 | Chou | G06T 3/4007 |
| 2017/0078706 A1* | 3/2017 | Van Der Vleuten | H04N 5/20 |

OTHER PUBLICATIONS

Wan, Pengfei, et al. "From 2D Extrapolation to 1D Interpolation: Content Adaptive Image Bit-Depth Expansion," Multimedia and Expo (ICME), 2012 IEE International Conference on Multimedia and Expo, Jul. 9, 2012, XP032235671, pp. 170-175.

Liu, Chun Hung, et al. "Bit-Depth Expansion by Adaptive Filter," ISCAS 2008, May 18, 2008, XP031392018, pp. 496-499.

Cheng, Cheuk-Hong, et al. "Bit-depth expansion by contour region reconstruction," Circuits and Systems, ISCAS 2009, May 24, 2009, XP031479355, pp. 944-947.

Banterle, Francesco, et al. "High Dynamic Range Imaging and Low Dynamic Range Expansion for Generating HDR Content," Computer Graphics Forum, vol. 28, No. 8, Dec. 1, 2009, XP55031838, pp. 2343-2367.

Strom, Jacob, et al. "Ericsson's response to CfE for HDR and WCG," International Organisation for Standardisation, ISO/IEC JTC1/SC29/WG11 MPEG2014/m36184, Feb. 2015, XP030064552, 10 pages.

Wittmann, Steffen, "SEI message on post-filter hints for high fidelity," Joint Video Team (JVT) of ISO/IEC MPEG & ITU-T VCEG (ISO/IEC JTC1/SC29/WG11 and ITU-T SG16 Q.6), Document JVT-T039R1, Jul. 31, 2006, XP030006526, 12 pages.

Wittmann, Steffen and Thomas Wedi, "Transmission of Post-Filter Hints for Video Coding Schemes," Image Processing 2007, Sep. 1, 2007, XP031157683, pp. I-81 to I-84.

Dong, Jie et al., "SEI message: post filters to enhance the chroma planes," Joint Collaborative Team on Video Coding (JCT-VC) of ITU-T SG 16 WP 3 and ISO/IEC JTC 1/SC 29/WG11, Document: JCTVC-N0224, Jul. 2013, XP30114732, pp. 1-4.

International Search Report and Written Opinion of International Searching Authority issued in corresponding application No. PCT/EP2015/080923, dated Apr. 13, 2016, 22 pages.

* cited by examiner

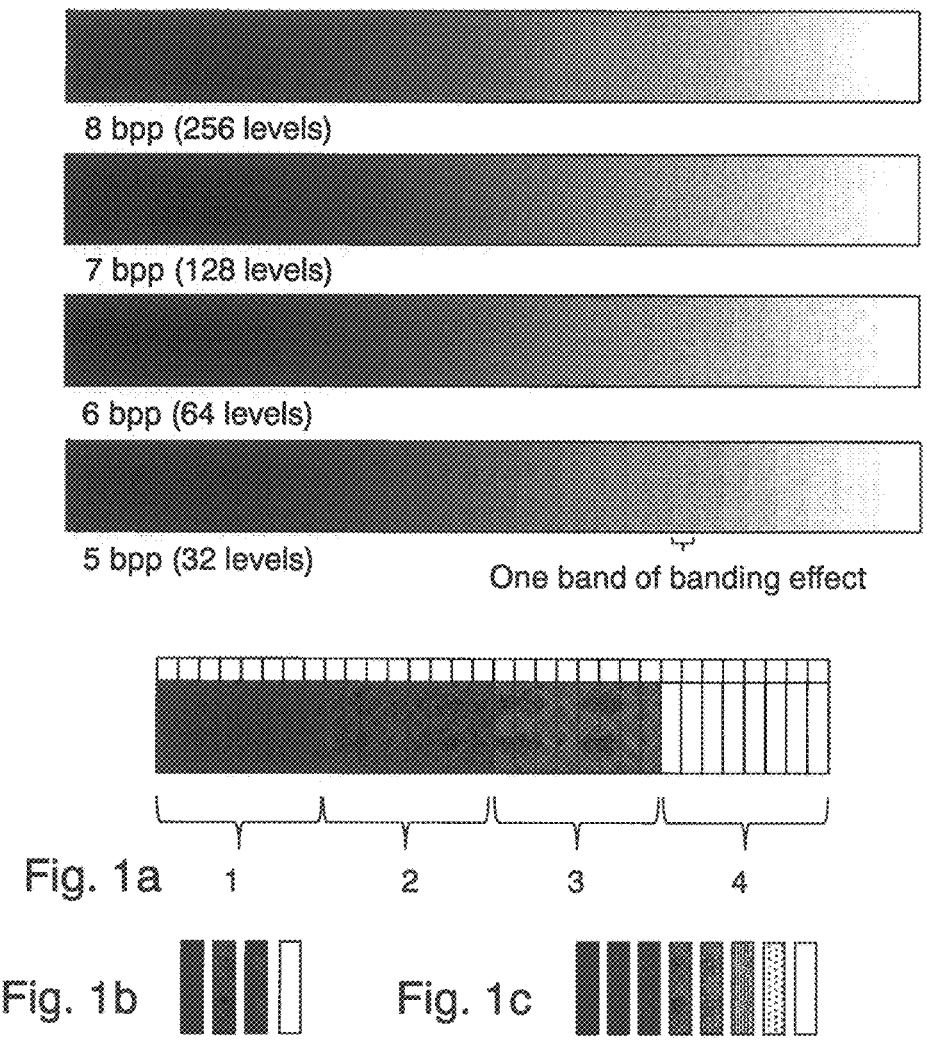
Fig. 1a
Fig. 1b
Fig. 1c
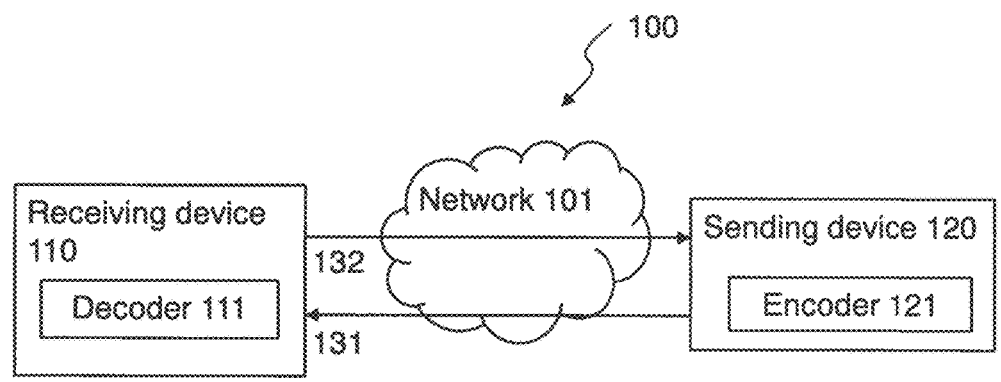
Fig. 2

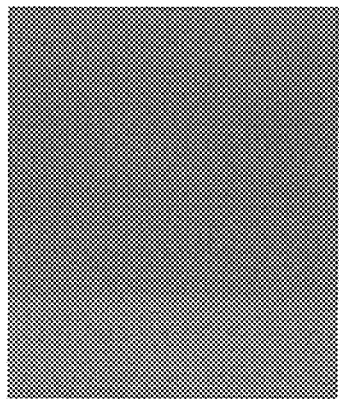
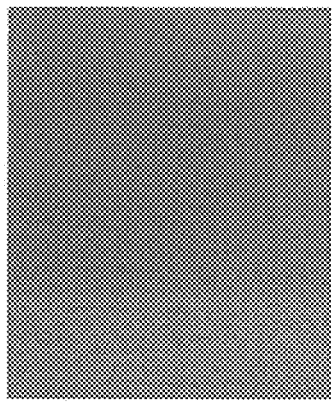
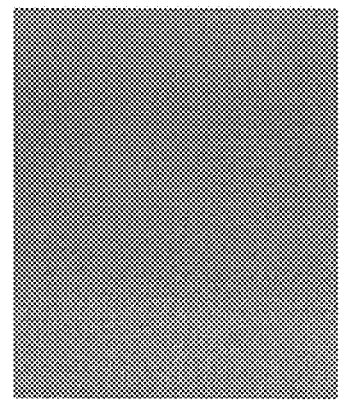
Fig. 5a  Fig. 5b  Fig. 5c
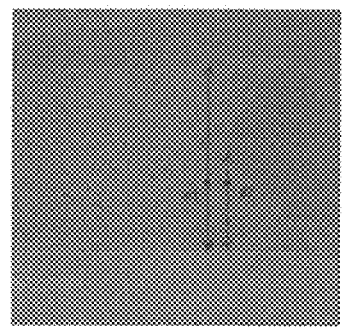
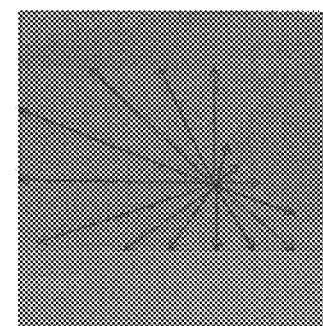
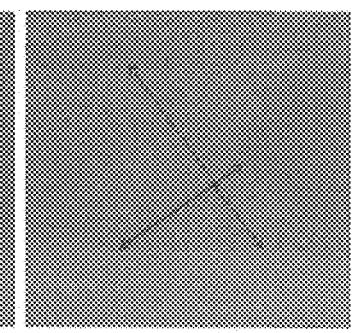
Fig. 6a  Fig. 6b  Fig. 6c
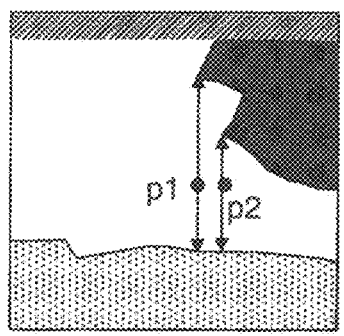
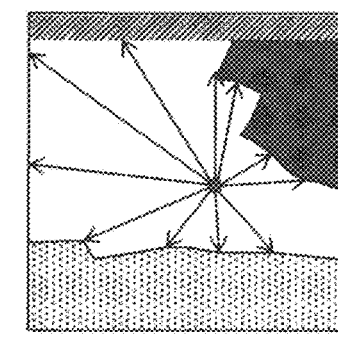
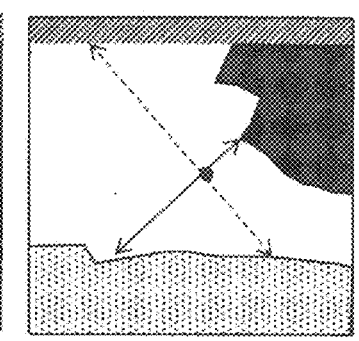
Fig. 7a  Fig. 7b  Fig. 7c

METHODS, RECEIVING DEVICE AND SENDING DEVICE FOR MANAGING A PICTURE

CROSS-REFERENCE TO RELATED APPLICATIONS

This application is a 35 U.S.C. § 371 National Phase Entry Application from PCT/EP2015/080923, filed Dec. 22, 2015, and designating the United States, which claims priority to US. Provisional Application No. 62/163,009, filed on May 18, 2015. The contents of both applications are incorporated by reference.

TECHNICAL FIELD

Embodiments herein relate to image processing, such as processing of video images.

BACKGROUND

High Dynamic Range (HDR) imaging has become an increasingly hot topic within the TV and multimedia industry in the last couple of years. While screens capable of displaying the HDR video signal are emerging at the consumer market, over-the-top (OTT) players such as Netflix have announced that HDR content will be delivered to the end-user. Standardization bodies are working on specifying the requirements for HDR. For instance, in the roadmap for Digital Video Broadcasting (DVB), Ultra High Definition Television 1 (UHDTV1) phase 2 will include HDR support. Moving Pictures Expert Group (MPEG) is currently working on exploring how HDR video could be compressed.

HDR imaging is a set of techniques within photography that allows for a greater dynamic range of luminosity compared to standard digital imaging. Dynamic range in digital cameras is typically measured in f-stops, where 1 f-stop is a doubling of the amount of light. A standard Liquid Crystal Display (LCD) High Definition Television (HDTV) using Standard Dynamic Range (SDR) can display less than or equal to 10 stops. HDR is defined by Moving Pictures Expert Group (MPEG) to have a dynamic range of over 16 f-stops.

High Efficiency Video Coding (HEVC) is a block based video codec standardized by International Telecommunication Union's Telecommunication Standardization Sector (ITU-T) and MPEG, which utilizes both temporal and spatial prediction. Spatial prediction is achieved using intra (I) prediction from within the current frame. Temporal prediction is achieved using inter (P) or bi-directional inter (B) prediction on block level from previously decoded reference pictures. The difference between the original pixel data and the predicted pixel data, referred to as the residual, is transformed into the frequency domain and quantized before being transmitted together with necessary prediction parameters such as mode selections and motion vectors. By quantizing the transformed residuals, the tradeoff between bitrate and quality of the video may be controlled. The level of quantization is determined by the quantization parameter (QP).

Scalable High Efficiency Video Coding (SHVC) is an extension to HEVC that supports temporal, spatial, SNR, bitdepth, color gamut and hybrid codec scalability. SHVC is useful when coding two or more versions of the same content at different qualities. The bitdepth scaling in SHVC is made using an 8×8 filter where a transmitted phase parameter is used to select the filter parameters.

A picture element (pixel for short) is the smallest element of a digital image and holds the luminance and color information of that element.

The luminance and color can be expressed in different ways depending on the use case. Displays usually have three color elements—red, green and blue, which are lit at different intensities depending on what color and luminance is to be displayed. It becomes therefore convenient to send the pixel information in RGB pixel format to the display, i.e. using three components, R, G and B. Since the signal is digital the intensity of each component of the pixel must be represented with a fixed number of bits, referred to as the bitdepth of the component. For instance, an RGB pixel format with 8 bits per color component can be written RGB888. A bitdepth of n can represent $2^n$ different values, e.g. 256 values per component for 8 bits and 1024 values per component for 10 bits.

When video needs to be compressed it is convenient to express the luminance and color information of the pixel with one luminance component and two color components. This is done since the human visual system (HVS) is more sensitive to luminance than to color, meaning that luminance can be represented with higher accuracy than color. This pixel format is often referred to Y'UV where Y' stands for luminance and U and V stands for the two color components. The conversion between RGB and Y'UV for HDTV is to be made using the following matrix multiplications defined in BT.709:

$$\begin{bmatrix} Y' \\ U \\ V \end{bmatrix} = \begin{bmatrix} 0.2126 & 0.7152 & 0.0722 \\ -0.09991 & -0.33609 & 0.436 \\ 0.615 & -0.55861 & -0.05639 \end{bmatrix} \begin{bmatrix} R \\ G \\ B \end{bmatrix}$$

$$\begin{bmatrix} R \\ G \\ B \end{bmatrix} = \begin{bmatrix} 1 & 0 & 1.28033 \\ 1 & -0.21482 & -0.38059 \\ 1 & 2.12798 & 0 \end{bmatrix} \begin{bmatrix} Y' \\ U \\ V \end{bmatrix}$$

Fourcc.org holds a list of defined YUV and RGB formats. The most commonly used pixel format for standardized video codecs (e.g. H.264, MPEG-4, HEVC) is YUV420 (aka YV12) planar where the U and V color components are subsampled in both vertical and horizontal direction and the Y, U and V components are stored in separate chunks for each frame. Thus for a bitdepth of 8 bits per component, the number of bits per pixel (bpp) is 12, where 8 bits represents the luminance and 4 bits the two color components.

When a pixel consists of several channels, or components, e.g. a luminance channel and two color channels, the information in only one of these channels for a pixel is sometimes referred to as a sub-pixel.

Color banding, or banding for short, is an artifact that may be visible in gradient areas if the bitdepth is not sufficiently high. Color banding is characterized by abrupt changes between shades of the same colors. For instance, natural gradients like sunsets, dawns or clear blue skies may show some banding effects even at 8 bits per channel. An example of color banding artifacts can be seen in FIG. 1a, where the number of bits per pixels or, equivalently, grey levels, varies from 8 bpp (256 grey levels) to 5 bpp (32 gray levels). At the very bottom of FIG. 1a, a banding artifact is represented using only black and white for the sake of reproducibility. A row of pixels is shown. A first band $1_{x,y}$ or banding effect, is represented by black. A second band 2 is represented by a first pattern. A third band 3 is represented by a second pattern. Finally, a fourth band 4 is represented by white. In the example at the bottom, the bands are much wider than in the other examples. In FIG. 1b, a bitdepth with four levels is illustrated, i.e. two bits are used for representing intensity of pixels. In FIG. 1c, a further bitdepth with eight levels is illustrated, i.e. three bits are used for representing intensity of pixels.

The Human Visual System (HVS) is not equally sensitive to all colors. For instance, it is more sensitive to green and red than it is to blue. Color banding is therefore less perceptible in blue areas than in green areas.

Small differences in absolute pixel values are usually difficult to detect due to how the HVS interprets what we see. However, in gradient areas banding artifacts may be visible if the gray levels have been sampled too sparsely, e.g. if a too low bitdepth is used.

To some extent, color banding can be reduced by introducing dithering in the downsampling step, a method that creates an illusion of higher bitdepth by diffusion, e.g. creating a pattern, of available values from the color palette. Dithering requires that the image is seen sufficiently far away for the illusion to have effect. When looked upon close-up dithering will instead display grain artifacts. Dithering is commonly used when producing posters and for displaying images where the bitdepth of the printer or display is less than that of the image. The problem with dithering is that the perceived resolution decreases. When looking at the picture close-up dithering artifacts in the form of patterns or grain may be visible.

Another way of reducing/removing color banding is to make sure to have enough bitdepth to start with. For HDR video, where the dynamic range is significantly higher compared to SDR, a bitdepth of at least 11-12 bits is needed to guarantee that no color banding artifacts will be visible.

Video captured with a bitdepth of 8 bits per component could be upsampled to a higher bitdepth for display at a 10 bit screen. However, simply upsampling the bitdepth by shifting pixel by pixel will keep the problem of banding.

The bitdepth upsampling in SHVC uses a local 8×8 filter and requires parameters to be transmitted to determine the filter parameters. Local filters may reduce the transitions of a shallow gradient but may not fully reproduce the shallow gradient. Moreover, pixels in non-gradient areas are also affected which may reduce the sharpness of the overall picture.

SUMMARY

An object may be to improve perceived image quality.

According to an aspect, the object is achieved by a method, performed by a receiving device, for managing a picture is provided. The picture comprises pixels, wherein pixel values of the pixels are represented with a first bitdepth. The method comprises converting the pixel values of the pixels represented with the first bitdepth into the pixel values represented with a second bitdepth, wherein the first bitdepth is smaller than the second bitdepth. The method comprises identifying a group of pixels among the pixels of the picture. The group of pixels comprises two pixels, wherein the two pixels are adjacent to each other along a direction, wherein pixel values of the group of pixels are equal to each other. The method comprises, for at least one of the two pixels, estimating a respective estimated pixel value based on a first pixel value and a second pixel value. The first and second pixel values are derived from two edge pixel values of two edge pixels, wherein each one of the two edge pixels is located along the direction and excluded from the group of pixels, and wherein each one of the two edge pixels is adjacent to a respective end of the group of pixels with respect to the direction.

According to another aspect, the object is achieved by a method, performed by a sending device, for encoding a picture into a bitstream, wherein the picture comprises pixels. The method comprises converting pixel values of the pixels represented with a second bitdepth to pixel values of the pixels represented with a first bitdepth, wherein the first bitdepth is smaller than the second bitdepth. The method comprises encoding the picture with the pixel values of the pixels represented with the first bitdepth into the bitstream. The method comprises encoding a message into the bitstream, wherein the message indicates whether or not to perform, by a receiving device, a procedure for managing banding artefacts.

According to a further aspect, the object is achieved by a receiving device for managing a picture. The picture comprises pixels, wherein pixel values of the pixels are represented with a first bitdepth. The receiving device is configured for converting the pixel values of the pixels represented with the first bitdepth into the pixel values of the pixels represented with a second bitdepth, wherein the first bitdepth is smaller than the second bitdepth. The device is configured for identifying a group of pixels among the pixels of the picture. The group of pixels comprises two pixels, wherein the two pixels are adjacent to each other along a direction, wherein pixel values of the group of pixels are equal to each other. The device is configured for, for at least one of the two pixels, estimating a respective estimated pixel value based on a first pixel value and a second pixel value. The first and second pixel values are derived from two edge pixel values of two edge pixels, wherein each one of the two edge pixels is located along the direction and excluded from the group of pixels, and wherein each one of the two edge pixels is adjacent to a respective end of the group of pixels with respect to the direction.

According to yet another aspect, the object is achieved by a sending device, for encoding a picture into a bitstream, wherein the picture comprises pixels. The sending device is configured for converting pixel values of the pixels represented with a second bitdepth to pixel values of the pixels represented with a first bitdepth, wherein the first bitdepth is smaller than the second bitdepth. The sending device is configured for encoding the picture with the pixel values of the pixels represented with the first bitdepth into the bitstream. The sending device is configured for encoding a message into the bitstream, wherein the message indicates whether or not to perform, by a receiving device receiving the bitstream, a procedure for managing banding artefacts.

According to further aspects, the object is achieved by computer programs and carriers for the computer programs corresponding to the aspects above.

According to the embodiments herein, a video signal is up-sampled, e.g. converted, to a higher bitdepth while removing the banding artifacts due to the initial low bitdepth. This is done by detecting where in the picture a group of adjacent pixels with the same value exists and then in a controlled way adjust, e.g. ramp up, the pixel values of the pixels in the group to create diversity among the pixel values of the group. For example, the pixel values may be linearly approximated from edge pixel values. Thus, removing banding effect(s) where all pixel values of the group are the same.

In a first embodiment, the pixels of the picture are first traversed horizontally, row-by-row, and for each pixel it is determined if it belongs to a group of pixels. The group of pixels may be comprised in a gradient described by a plurality of such groups of adjacent pixels with the same value within a respective group. If a pixel is at the end of the group of pixels, the values in the group of pixels are interpolated between the values bordering the group of pixels, with a maximum change of the difference in bitdepth, e.g. 10 bits–8 bits=2 bits, which corresponds to 2^2=4 levels. The same procedure is then performed vertically, column-by-column. Finally, the result for each pixel and direction may be weighted to produce a final value for each pixel.

In a second embodiment, other directions of a gradient than only the vertical and horizontal directions are considered at the same time. For each pixel in a group of pixels, i.e. an area where pixel values are the same, it is first determined where the closest bordering pixels of the group of pixels are in each direction, e.g. in one direction in each quadrant. The new pixel value is then interpolated from the position of the determined closest bordering pixels.

In a third embodiment, a video signal or even a single picture that is to be submitted over a network is first shifted to a lower bitdepth before encoding. After decoding the video signal at the receiving side, the video is shifted back to the initial bitdepth, or an even higher bitdepth, using one of the methods described in the first and second embodiments. This allows the video to be coded at a lower bitdepth, resulting in a lower bitrate, without introducing banding artifacts.

An advantage with the proposed solution is that it removes banding artifacts when converting from a first (lower) bitdepth to a second (higher) bitdepth.

This is useful if the video material to start with has a too low bitdepth. The embodiments herein thus provide a means to re-master the captured/available bitdepth to a higher bitdepth. The embodiments herein are also useful if the bitdepth for some reason has been down converted.

Another advantage with the proposed solution is that it is possible to "zoom in" the bitdepth (in practice change the exposure) without getting banding artifacts while doing that. This could, for instance, be useful for medical imaging, such as images from X-ray detectors and Computed Tomography (CT) scanners or for astronomical imagery where one would like to enhance the details at a certain value range without producing banding artifacts at the same time.

The embodiments may also be used when encoding video requiring a high bitdepth, such as HDR video. By shifting down the bitdepth before encoding the video, fewer bits may need to be transmitted. By shifting up the bitdepth and applying the anti-banding filter after decoding, the missing gradient information of the original video may be well approximated. The proposed solution solves this without the need for transmitting any filter parameters related to the original video.

The embodiments herein are also useful if the transportation pipe (i.e. compression, other processing, etc.) only supports a certain bitdepth, but the receiving device (e.g. output screen) supports a higher bitdepth. By upsampling the bitdepth with the anti-banding approach after decoding, the gradients of the video will be refined.

Even if the bit-depth at hand is sufficient to provide imperceptible transitions for gradient surfaces, upsampling the bitdepth using the methods described herein may give a benefit of preserving the perceived video quality during video processing and editing.

BRIEF DESCRIPTION OF THE DRAWINGS

The various aspects of embodiments disclosed herein, including particular features and advantages thereof, will be readily understood from the following detailed description and the accompanying drawings, wherein:

FIG. 1a depicts examples of color banding artefacts;

FIGS. 1b and 1c illustrate bitdepths with four and eight levels respectively;

FIG. 2 depicts an exemplifying system in which embodiments of the present invention may be implemented;

FIGS. 5a-5c show results of applying the bitdepth upscaling of an embodiment according to the present invention, to a gradient picture of a sky;

FIGS. 6a and 7a illustrate that adjacent slopes may have very different lengths when using the method according to an embodiment of the present invention;

FIGS. 6b and 7b illustrate that a pixel may be interpolated from edge pixels in all possible directions;

FIGS. 6c and 7c illustrate that a pixel may be interpolated from a closest edge, its opposite closest edge, and even the orthogonally closest edges.

DETAILED DESCRIPTION

Figure 3:
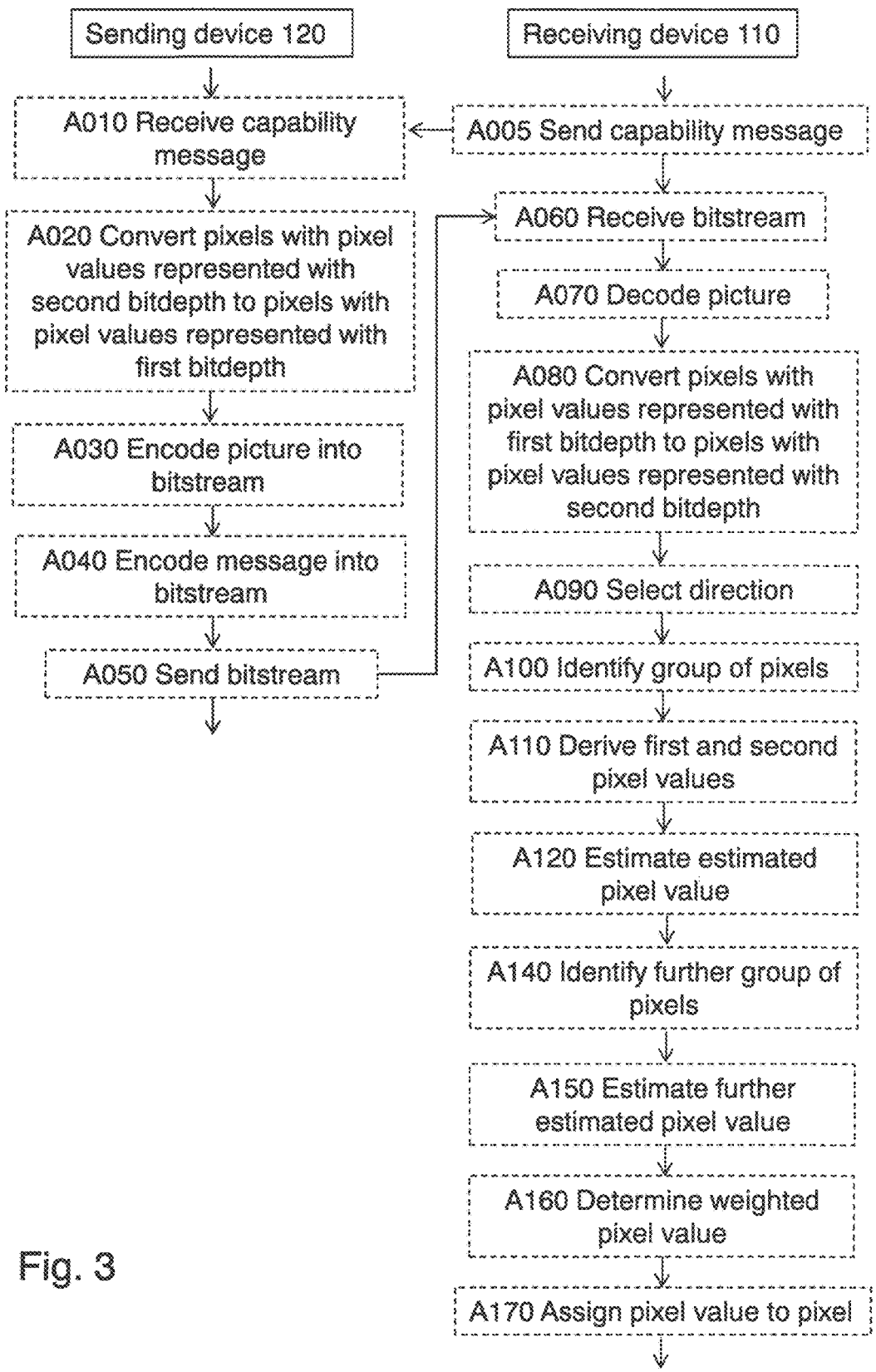
FIG. 3 illustrates an exemplifying method according to embodiments herein.

Throughout the following description similar reference numerals have been used to denote similar features, such as actions, steps, nodes, elements, units, modules, circuits, parts, items or the like, when applicable. In the Figures, features that appear in some embodiments are indicated by dashed lines.

FIG. 2 depicts an exemplifying system 100 in which embodiments herein may be implemented.

The system 100 includes a network 101, such as a wired or wireless network. Exemplifying networks include cable television network, internet access networks, fiber-optic communication networks, telephone networks, cellular radio communication networks, any Third Generation Partnership Project (3GPP) network, Wi-Fi networks, etc.

In this example, the system 100 further comprises a receiving device 110 (which may also be referred to as a device), comprising a decoder 111, and a sending device 120 (which may also be referred to as a further device), comprising an encoder 121. In some examples, this means that the decoder 111 performs the actions performed by the receiving device 110, as described below. Moreover, this may mean that the encoder 121 performs the actions performed by the sending device 120, as described below.

The receiving device 110 and/or the sending device 120 may be embodied in the form of various platforms, such as television set-top-boxes, video players/recorders, video cameras, Blu-ray players, Digital Versatile Disc (DVD)- players, media centers, media players, user equipments and the like. As used herein, the term "user equipment" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device or the like.

The sending device 120 may also be a server, e.g. providing a bitstream to the receiving device 110. This means that the sending device 120 may be comprised in a network node.

As an example, the sending device 120 and/or the encoder 121 may send 131, over the network 101, a bitstream to the receiving device 110, and/or the decoder 111. The bitstream may comprise video data. The video data may thus for example represent pictures of a video sequence. In case of HEVC, the bitstream comprises a Coded Video Sequence (CVS) that is HEVC compliant.

The bitstream may thus be an encoded representation of a video sequence to be transferred from the sending device 120 to the receiving device 110.

Additionally, the receiving device 110 and/or the decoder 111 may send 132 over the network 101 messages to the sending device 120. As an example, the messages may include information about capabilities of the receiving device 110.

FIG. 3 illustrates an exemplifying method according to embodiments herein when implemented in the system 100 of FIG. 2.

The receiving device 110 performs a method for managing a picture. The sending device 120 performs a method for encoding a picture into a bitstream.

The picture comprises pixels, wherein pixel values of the pixels are represented with a first bitdepth, i.e. a low bitdepth such as 8 bits per pixel. The picture may be compressed or non-compressed. The picture referred to here may be part of another picture, i.e. the picture may be a portion of the other picture, such as a block of the other picture. This means that the first bitdepth is indicative of a first number of bits used for representing pixel values of the pixels.

The picture may be comprised in a video sequence. The video sequence may be a High Dynamic Range "HDR" video.

One or more of the following actions may be performed in any suitable order.

Action A005

The receiving device 110 may send capability message to the sending device 120 (this corresponds to send 132 in FIG. 2). The capability message may indicate one or more capabilities of the receiving device 110. A capability may be that the receiving device 110 is able to reduce banding effect as described herein, such as thanks to at least action A120, and preferably also actions A080 and A100.

The capability message may be a Real Time Streaming Protocol (RTSP), Session Description Protocol (SDP) or Hypertext Transfer Protocol (HTTP) request message.

RTSP is a network control protocol that typically uses Real-time Transport Protocol (RTP) for media transport. SDP is used to negotiate multimedia communication services and may be used in conjunction with RTP and RTSP. HTTP requests may be used to request a stream in HTTP streaming.

Action A010

The sending device 120 may receive, from the receiving device 110, the capability message indicating that the receiving device 110 is capable of performing a procedure for managing banding artefacts, which may include at least action A120, and preferably also A080 and A100. Thus, the estimation in action A120 may be part of the procedure for managing banding artefacts.

Action A020

The sending device 120 converts pixel values of the pixels represented with the second bitdepth to pixel values of the pixels represented with the first bitdepth, wherein the first bitdepth is smaller than the second bitdepth. The second bitdepth may be referred to as "higher" or "high" bitdepth, wherein "higher" or "high" are considered in relation to the first bitdepth that may also be referred to "lower" or "low". An example of the second bitdepth is 16 bits per pixel.

Action A030

The sending device 120 encodes the picture with the pixel values of the pixels represented with the first bitdepth into the bitstream. The encoding may or may not include compression of the picture.

Action A040

The sending device 120 encodes a message into the bitstream, wherein the message indicates whether or not to perform, by the receiving device 110 which receives the bitstream sent in subsequent action A050, the procedure for managing banding artefacts.

The message may be a Supplemental Enhancement Information (SEI) message or signalled in Sequence Parameter Set (SPS), Picture Parameter Set (PPS) or Video Usability Information (VUI) metadata sent within the bitstream.

Action A050

The sending device 120 may send the bitstream to the receiving device 110, wherein the receiving device 110 performs the procedure for managing banding artefacts based on the message encoded in action A040.

Action A060

The receiving device 110 may receive the bitstream, which may include the message encoded in action A040. Thus, the receiving device 110 may receive, from the sending device 120, a message indicating whether or not to perform the procedure for managing banding artefacts.

Accordingly, the procedure for managing banding artefacts may be performed based on the message.

Action A070

The receiving device 110 may decode the picture from the bitstream received in action A060. Typically, action A070 is performed before action A080, e.g. in order to decompress the picture if needed.

Action A080

The receiving device 110 converts the pixel values of the pixels represented with the first bitdepth into pixel values of the pixels represented with a second bitdepth, wherein the first bitdepth is smaller than the second bitdepth.

Action A090

The receiving device 110 may select a direction. Please note that "direction" may also be known as "direction of the picture". In some embodiments, the selected direction refers to one of rows of the picture, columns of the picture and pixels along a line at an angle with respect to a rows or columns of the picture.

Action A090 may be performed before Action A100. In that case, the selected direction may be based on distance, e.g. in terms of pixels, to a closest edge pixel, wherein the closest edge pixel is one of the two edge pixels. The two edge pixels are defined with respect to a group of pixels, the group of pixels comprising at least two pixels with equal pixel values, as the adjacent pixels to the group of pixels. The closest edge pixel has a shortest distance to said at least one of the two pixels of the group of pixels. For each pixel of the group of pixels a respective direction may be selected. The respective selected directions may be different from each other, or two or more respective selected directions may be equal to each other.

Action A100

The receiving device 110 identifies a group of pixels among the pixels of the picture, wherein the group of pixels comprises two pixels. Expressly, the group of pixels comprises at least two pixels. The two pixels are adjacent to each other along the direction. This means that pixels of the group of pixels are adjacent pixels along the direction. The group of pixels may be one of a plurality of groups of pixels, wherein all pixels of the plurality of groups are consecutive along the direction.

The pixel values may represent intensity or colour value of a component of the pixel. The component refers to one or more of R, G, B in case of RGB-coded pixels, one or more of Y, U, V in case of YUV-coded pixels and the like.

In this context, it is worth mentioning that the group of pixels may be identified based on more than one component, such as YUV-components, of the picture as will be described in more details below. The group of pixels may also be determined based on group of pixels from previous and/or succeeding pictures of the video stream to avoid possible flickering.

Action A110

Action A110 may be performed before action A120 below in order to adjust difference between first and second pixel values such that a difference of only one level is achieved. Here the level refers to quantization as achieved with the first bitdepth.

Thus, the receiving device 110 may derive the first and second pixel values from the two edge pixel values by setting the first and second pixel values in a range defined by the two edge pixel values, wherein a difference between the first and second pixel values is only one level in accordance with the first bitdepth. In this manner, it may be ensured that the difference between the first and second pixel values is only one level in accordance with the first bitdepth.

Figure 4A:
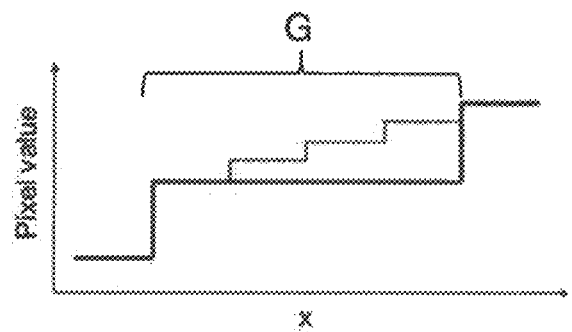
FIGS. 4a-4d respectively show examples of the four different classifications of flat sections considered for a group of pixels: "upwards", "downwards", "hill" and "valley"
Figure 4B:
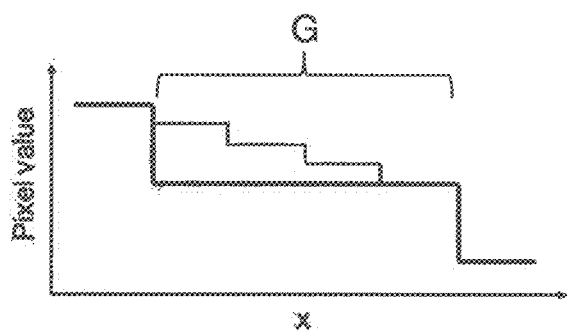
Figure 4C:
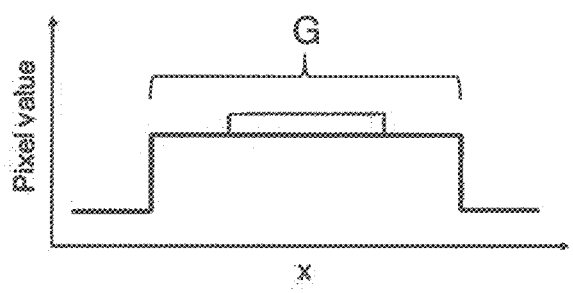
Figure 4D:
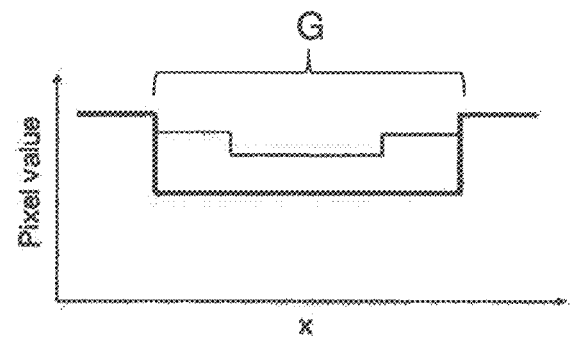

In case of "upwards" and "downwards" classifications of flat sections, see FIGS. 4a and 4b, the difference between the two edge pixel values is at least two levels in accordance with the second bitdepth.

As an example, a row of pixels represented with the first bitdepth, e.g. 8 bits per pixel, may have the values 2, 1, 1, 1, 0. After converting the pixel values from the first bitdepth to the second bitdepth, e.g. 10 bits per pixel, the pixels will have the values 8, 4, 4, 4, 0. One level in the first bitdepth thus corresponds to a level in the second bitdepth that is four times larger. An overlapping level of size 6, corresponding to the maximum pixel value difference between the pixels values represented with the second bitdepth and the first bitdepth would correspond to a level of size of 1.5 in the first bitdepth.

Action A120

The receiving device 110, for at least one of the two pixels, estimates a respective estimated pixel value based on a first pixel value and a second pixel value, wherein the first and second pixel values are derived from two edge pixel values of two edge pixels, wherein each one of the two edge pixels is adjacent to a respective group of pixels with respect to the direction.

The group of pixels may be one of a plurality of groups of pixels, wherein the plurality of groups of pixels may define a gradient, along the direction, with respect to respective converted pixel values of each group of pixels, wherein all pixels of the plurality of groups may be consecutive along the direction. This means that the plurality of groups of pixels define a gradient along the direction. Each part of the gradient, comprising consecutive pixels having equal pixel value, is represented by a respective group of pixels among the plurality of groups of pixels. In this context, the gradient is thus defined while considering the plurality of groups, i.e. a global gradient in view of the plurality of groups.

In contrast to the global gradient, there is also a local gradient, which considers only one group of pixels and the first and second pixel values, derived from the two edge pixel values adjacent to said only one group of pixels. This means that the respective estimated pixel values of the group of pixels define the local gradient, along the direction, with respect to respective converted pixel values of said only one group of pixels.

As will be elaborated with reference to FIGS. 4a-4d, "hills", "valleys", "downwards" and "upwards" may be identified for the group of pixels, currently being under consideration.

Action A140

The receiving device 110 may identify a further group of pixels among pixels of the picture, wherein the further group of pixels comprises two further pixels, wherein the two further pixels are adjacent to each other along a further direction, wherein pixel values of the further group of pixels are equal to each other. In further examples, as described below in e.g. FIG. 6b, yet further groups of pixels may be identified along yet further directions.

Action A150

The receiving device 110 may, for at least one of the two further pixels, estimate a respective further estimated pixel value based on a third pixel value and a fourth pixel value, wherein the third and fourth pixel values are derived from two further edge pixel values of two further edge pixels, wherein each one of the two further edge pixels is located along the further direction, and wherein each one of the further two edge pixels is located adjacent to a respective end of the further group of pixels with respect to the further direction.

The direction and the further direction may be orthogonal to each other.

Action A160

The receiving device 110 may, for each pixel of the picture, determine a respective weighted pixel value based on a weighted average over the respective estimated pixel values and the respective further estimated pixel values.

In some examples, the weighted average may be based on distance, in terms of pixels, from said each pixel to at least one of the two edge pixels and the two further edge pixels.

The weighted average may be an arithmetic mean, i.e. weights of the weighted average may be equal to one divided by the number of directions (or equivalently, number of identified groups and further groups of pixels), or another constant value.

Action A170

The receiving device 110 may, for each one of the two pixels, assign the respective estimated pixel value to said each one of the two pixels. The assigning may comprise, for each one of the two pixels, assigning the respective weighted pixel value to said each one of the two pixels.

In practice, action A170 may be done as part of action A080. Notably, action A080 may be performed after action A100 and A120, while assuming the respective estimated pixel value is then temporarily stored before being assigned to said each one of the two pixels when action A080 and A170 are performed.

With the embodiments herein, a picture is upsampled with respect to bitdepth and then filtered for each pixel to better resemble the perceptual quality of the original non-quantized signal. More specifically, the embodiments herein solve the banding problem by incrementally increasing the pixel values of an identified group of pixels. The group of pixels may here be referred to as a flat section.

Embodiment 1: Traverse Horizontally and Vertically to Detect and Process Flat Sections In a first embodiment, each pixel is first upshifted to the new bitdepth according to a conventional method, for instance: $pOut_{x,y}=(pIn_{x,y}<<(bitdepthOut-bitdepthIn))+(1<<(bitdepthOut-bitdepthIn-1))$ where bitdepthOut>bitdepthIn. $pIn_{x,y}$ is the input pixel at position (x,y) and $pOut_{x,y}$ is the output pixel at (x,y).

The term $1<<(bitdepthOut-bitdepthIn-1)$, which also may be omitted, is added to get the middle value between the quantized values which gives a better approximation of the original value.

The next step is to traverse the pixels of the picture in raster scan order. When traversing the pixels, flat sections are identified where the pixel value is not changed between pixels. Four different classifications are considered when identifying flat sections to be processed:

1. "Upwards": the pixel value is increased before the flat section and increased after the flat section;
2. "Downwards": the pixel value is decreased before the flat section and decreased after the flat section;
3. "Hill": the pixel value is increased before the flat section and decreased after the flat section;
4. "Valley": the pixel value is decreased before the flat section and increased after the flat section.

These classifications are exemplified in FIGS. 4a-4d. In one version of the embodiment only the cases where the value is increased and/or decreased by one (in the input picture) are considered.

The next step is to adjust the pixel values in the flat section to smoothen the gradient. This may be done by interpolating the pixel values in the flat section in a way that depends on the classification of the flat section, i.e. if the values before and after the flat section are increasing or decreasing. The value added to the upshifted $pOut_{x,y}$ ranges between 0 and $2^{(bitdepthOut-bitdepthIn)}-1$. In one version of the embodiment, in order to better approximate the absolute pixel values of the original picture, the value added to the upshifted $pOut_{x,y}$ is shifted down by bitdepthOut-bitdepthIn-1 giving the range $[-2^{(bitdepthOut-bitdepthIn-1)}, 2^{(bitdepthOut-bitdepthIn-1)}-1]$ of possible values to add to $pOut_{x,y}$. By doing so, the average intensity of the picture is maintained.

The interpolation could be approximated with a linear function or a curve that more closely follows the curvature of the gradient area of the picture, i.e. the pixel values increment according to a function based on the previous and/or following pixels along the direction. In FIGS. 4a-4d, the pixel values for the upshifted values are marked in bold. The lines with regular thickness illustrate the new pixel values for the flat sections. In these examples the pixel values of the input picture have been shifted up by 2 bits, making it possible to represent 4 levels where it was previously 1 level. Note that only two levels are used for the "hill" and "valley" cases in the example below since these are changing direction halfway. In another version of the embodiment, all levels may be utilized for the "hill" and "valley" cases. In yet another version of the embodiment, only one level is used for the "hill" and "valley" cases, meaning that hills remain flat and valleys are fully filled.

The respective estimated pixel values of the group of pixels may define a function, wherein the shape of the function, depends on whether the values of the two edge pixels are both higher, are both lower, or one is higher and the other one is lower than a value of the pixels in the flat section.

The respective estimated pixel values of the group of pixels may define a function, wherein the shape of the function also depends on at least one additional pixel along the direction beyond any of the edge pixels.

To get the refined gradient in both horizontal and vertical direction, the pixels should be traversed in both horizontal and vertical directions. To calculate the final pixel value considering the two directions, the result of the two directions may be weighted according to:

$$pTot_{x,y}=w1_{x,y}*pHor_{x,y}+w2_{x,y}*pVer_{x,y}$$

wherein $pHor_{x,y}$ and $pVer_{x,y}$ are the estimated pixel values for the pixel with picture coordinates (x,y) after traversing in horizontal and vertical directions respectively, and wherein the weights $w1_{x,y}$ and $w2_{x,y}$ for the horizontal and vertical directions respectively satisfy: $w1_{x,y}+w2_{x,y}=1$.

The weighting could be done by averaging the results from the two directions, i.e. $w1_{x,y}=w2_{x,y}=0.5$. The weights could also be set based on the distances $distHor_{x,y}$ and $distVer_{x,y}$ between the pixel to be estimated and the closest edge pixels in the horizontal and vertical direction respectively. A shorter distance should be given a higher weight than a longer distance. For instance, one can choose the weights as:

$$w1_{x,y}=distHor_{x,y}/(distHor_{x,y}+distVer_{x,y}) \text{ and}$$

$$w2_{x,y}=distVer_{x,y}/(distHor_{x,y}+distVer_{x,y}).$$

In one version of the embodiment, the anti-banding method described above is performed for each color component individually. Thus, the anti-banding method may be performed individually for each of the Y, U and V color components.

In another version of the embodiment, the same pixel modifications of the anti-banding method are performed on each one of the color components. For example, the same pixel modifications as for the Y component may be applied to the U and V components.

In yet another embodiment, information from other components is used when identifying the flat sections to process. For instance, along a horizontal line the Y, U and V components have the values indicated in the Table 1 below. If only the Y component was considered for identifying the flat regions, pixels 1 to 7 would be selected (underlined in the table). However, if the U and V components are also considered, then only pixels 1-4 would be selected as the flat section to process since only these pixels belong to a flat area for all three components.

TABLE 1

Example of pixel values for the Y, U and V components for nine pixels along a horizontal line. In one embodiment, only the pixels that belong to a gradient area in all components are considered as a flat section to process.

| Pixel x-position | 0 | 1 | 2 | 3 | 4 | 5 | 6 | 7 | 8 |
|---|---|---|---|---|---|---|---|---|---|
| Y | 3 | <u>4</u> | <u>4</u> | <u>4</u> | <u>4</u> | <u>4</u> | <u>4</u> | <u>4</u> | 5 |
| U | 78 | 79 | 79 | 79 | 79 | 23 | 34 | 36 | 40 |
| V | 12 | 13 | 13 | 14 | 14 | 56 | 45 | 44 | 32 |

In yet another version of the embodiment, information (e.g. collocated flat sections and classification of collocated flat sections, i.e. "upwards", "downwards", "hill", "valley") from previous and/or succeeding pictures may be used when identifying the flat sections to process and/or to determine the classification to use for the flat sections in the current picture. The information may relate to intensity and/or colour of collocated flat sections and/or classification of collocated flat sections. In this manner, artifacts due to flickering may be reduced and a smoother temporal appearance may be achieved.

FIGS. 5a-5c show results of applying the bitdepth upscaling of the embodiment to a gradient picture of a sky. A first original picture, FIG. 5a, has a bitdepth of 8 bits. For illustrative purposes, the bitdepth of the second picture, in FIG. 5b, has been down converted to 6 bits and then back to 8 bits using a conventional upsampling function. Banding artifacts can now be seen in FIG. 5b. In the third picture, in FIG. 5c, the method described herein is applied when converting back from 6 to 8 bits. Notice how the banding artifacts are removed, or at least less evident, and that the picture is very similar to the first picture.

Embodiment 2—Interpolate Pixel Value from its Closest Edge Pixel

In another embodiment, which is a generalization of the first embodiment, a pixel value in a group of pixels may be interpolated from edge pixels of the group of pixels not only in vertical and horizontal direction, but also in other directions. The group of pixels may here be referred to as "a flat area".

The method of the first embodiment described above works well, but may not be optimal in certain situations where the flat area to cover is relatively large. In FIGS. 6a and 7a, two pixels p1 and p2 are to be interpolated using the method described in Embodiment 1. The distance in the vertical direction, of the flat area to cover for p1 is about twice as long as the corresponding distance for p2. Since the edge pixel for p2 in the vertical direction is about the same distance from the bottom edge pixel as the middle of the distance, in the vertical direction, for p1, this could result in that an edge is introduced between pixels p1 and p2 due to difference in pixel values that are used for interpolation of pixels p1 and p2.

Ideally, the value of a pixel in a flat section should be interpolated from the edges of the flat area in all possible directions to the current pixel as illustrated in FIGS. 6b and 7b. This is, however, computationally demanding. A more lightweight approach is to determine the closest pixel that does not belong to the flat area, determine the closest edge in the opposite direction and interpolate the pixel value between these using weights depending on the distance between the current pixel and each edge. The orthogonally closest edge pixels may also be considered in the interpolation as illustrated with dashed arrows in FIGS. 6c and 7c.

The steps taken for interpolating a current pixel in a flat area (a flat area defined as at least two adjacent pixels having the same value for one or more considered components) may be:

1. Find geometrically closest pixel with value different from current pixel. This pixel, pe1, corresponds to the closest edge and may be found by performing a circular search and/or with prior knowledge from previous searches for adjacent pixels. See also actions A090, A100 and A110 above.

2. Find the closest pixel with value different from current pixel in opposite direction of pe1. This pixel, pe2, may be found by following the direction in the opposite direction from the current pixel. See also action A110 above 3. Optionally, find the closest pixels, pe3 and pe4, with different values from the current pixel in the orthogonal directions from the directions to pe1 and pe2. See action A140.

4. Interpolate the value for the current pixel depending on pe1, pe2 and optionally pe3 and pe4 according to:

$$pTot_{x,y}=pOut_{x,y}+w1_{x,y}*pe1sign_{x,y}+w2_{x,y}*pe2sign_{x,y}+w3_{x,y}*pe3sign_{x,y}+w4_{x,y}*pe4sign_{x,y}$$

where $pOut_{x,y}$ is $pOut_{x,y}$ from Embodiment 1, the weights $wn_{x,y}$, n=1, . . . 4, depend on the relative distance to the edge pixel pen and $pensign_{x,y}$ is a value indicating if the edge value is smaller or larger than the value of the current pixel. The weight $wn_{x,y}$ could for instance be calculated as:

$$wn_{x,y}=distn_{x,y}/(dist1_{x,y}+dist2_{x,y}+dist3_{x,y}+dist4_{x,y})$$

and $pensign_{x,y}$ as:
$pensign_{x,y}=2^{(bitdepthOut-bitdepthIn-1)}-1$ if pen>current pixel
$pensign_{x,y}=-2^{(bitdepthOut-bitdepthIn-1)}$ if pen<current pixel
Optionally, if $pensign_{x,y}$ of two opposite edge pixels have the same value, a "hill" or "valley" could be realized by having a weight for this.

Embodiment 3: Shifting Bitdepth Before Encoding

In this embodiment, the input picture is shifted down to a lower bitdepth before encoding (i.e. compression). After decoding, the signal is shifted up to the desired output bitdepth followed by applying the anti-banding filter. The benefit of shifting down the bitdepth before encoding is that fewer bits are needed to encode the bitstream. By applying the anti-banding filter at the receiving side the banding problems can be avoided and give a better subjective experience.

When encoding the video with the downshifted bitdepth, the encoder could either choose to set the input bitdepth to that of the down-shifted bitdepth (e.g. 9 bits) or to the bitdepth the encoder is designed for (e.g. 10 bits such as for the HEVC Main10 profile). In the latter case, in order for the decoder to interpret the decoded data correctly the encoder must signal to the decoder how to interpret the bitdepth. This could for instance be signaled in a Supplemental Enhancement Information (SEI) message, in the Sequence Parameter Set (SPS) or in the Picture Parameter Set (PPS). The SEI could look like this:

| bitdepth_reinterpretation_info( payloadSize ) { | Descriptor |
|---|---|
| bitdepth_comp_0 | ue(v) |
| all_components_have_same_bitdepth | u(1) |
| if ( !all_bitdepth_have_same_bitdepth ) { | |
| bitdepth_comp_1 | ue(v) |
| bitdepth_comp_2 | ue(v) |
| } | |
| } | |

Here bit_depth_comp_0 is the Y or G component, bit_depth_comp_1 is the U or B component and bitdepth_comp_2 is the V or R component. all_components_have_same_bitdepth is equal to 1, then bitdepth_comp_1 and bitdepth_comp_2 are derived from bitdepth_comp_0. If all_components_have_same_bitdepth is equal to 0 then bitdepth_comp_1 and bitdepth_comp_2 are read from the bitstream.

The decoder/receiver may by itself estimate whether the bitdepth upsampling anti-banding method needs to be applied or not. The encoder may also signal whether the anti-banding filter needs to be applied or not, e.g. using an SEI message. In this context, the anti-banding filter refers to the actions that enable smoothing of the flat sections, aka pixel values of the group of pixels. The SEI message may either be an empty SEI message indicating that banding artifacts may be available and that an anti-banding filter should preferably be deployed or the SEI message may also include one or more parameters indicating if an anti-banding filter is needed and how the anti-banding filter should be deployed. For instance, the SEI message may look like this:

| anti-banding_hint_info( payloadSize ) { | Descriptor |
|---|---|
| scene_requires_anti-banding_filter | u(1) |
| if (scene_requires_anti-banding_filter ) | |
| required_bitdepth | ue(v) |
| } | | where the required_bitdepth is the bitdepth the video should be upsampled to before applying the anti-banding filter.

In another version of the embodiment, a decoder/receiving device 110 signals to the encoder/sending device 120 that it has capabilities to apply the anti-banding filter after decoding. The encoder/sending device 120 may then decide to downshift the bitdepth before encoding the video to save bitrate.

Figure 8:
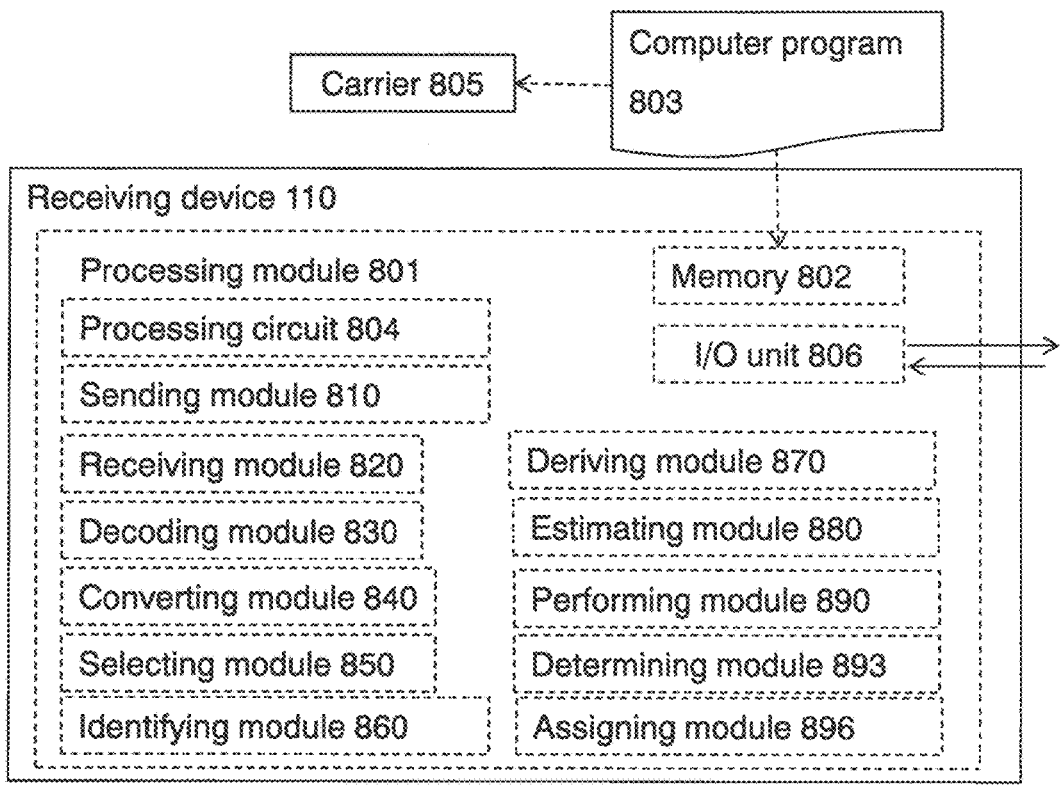
FIG. 8 illustrates a schematic block diagram of a receiving device, according to the embodiments of the present invention.

With reference to FIG. 8, a schematic block diagram of embodiments of the receiving device 110 of FIG. 2 is shown.

The receiving device 110 may comprise a processing module 801, such as a means, one or more hardware modules and/or one or more software modules for performing the methods described herein.

The receiving device 110 may further comprise a memory 802. The memory may comprise, such as contain or store, a computer program 803.

According to some embodiments herein, the processing module 801 comprises, e.g. 'is embodied in the form of' or 'realized by', a processing circuit 804 as an exemplifying hardware module. In these embodiments, the memory 802 may comprise the computer program 803, comprising computer readable code units executable by the processing circuit 804, whereby the receiving device 110 is operative to perform the methods of FIG. 3.

In some other embodiments, the computer readable code units may cause the receiving device 110 to perform the method according to FIG. 3 when the computer readable code units are executed by the receiving device 110.

FIG. 8 further illustrates a carrier 805, or program carrier, which comprises the computer program 803 as described directly above.

In some embodiments, the processing module 801 comprises an Input/Output unit 806, which may be exemplified by a receiving module and/or a sending module as described below when applicable.

In further embodiments, the processing module 801 may comprise one or more of a sending module 810, a receiving module 820, a decoding module 830, a converting module 840, a selecting module 850, an identifying module 860, a deriving module 870, an estimating module 880, a performing module 890, a determining module 893, and an assigning module 896 as exemplifying hardware modules. In other examples, one or more of the aforementioned exemplifying hardware modules may be implemented as one or more software modules.

Accordingly, the receiving device 110 is configured for managing a picture, wherein the picture comprises pixels, wherein pixel values of the pixels are represented with a first bitdepth.

Therefore, the receiving device 110, the processing module 801 and/or the converting module 840 is configured for converting the pixel values of the pixels represented with a first bitdepth to the pixel values of the pixels represented with a second bitdepth, wherein the first bitdepth is smaller than the second bitdepth.

Moreover, the receiving device 110, the processing module 801 and/or the identifying module 860 is configured for identifying a group of pixels among the pixels of the picture, wherein the group of pixels comprises two pixels, wherein the two pixels are adjacent to each other along a direction, wherein pixel values of the group of pixels are equal to each other.

Furthermore, the receiving device 110, the processing module 801 and/or the estimating module 880 is configured for, for at least one of the two pixels, estimating a respective estimated pixel value based on a first pixel value and a second pixel value, wherein the first and second pixel values are derived from two edge pixel values of two edge pixels, wherein each one of the two edge pixels is located along the direction and excluded from the group of pixels, and wherein each one of the two edge pixels is adjacent to a respective end of the group of pixels with respect to the direction.

The receiving device 110, the processing module 801 and/or the deriving module 870 may be configured for deriving the first and second pixel values from the two edge pixel values by setting the first and second pixel values in a range defined by the two edge pixel values, wherein a difference between the first and second pixel values is only one level in accordance with the first bitdepth.

The receiving device 110, the processing module 801 and/or the selecting module 850 may be configured for selecting the direction based on distance to a closest edge pixel, wherein one of the two edge pixels is the closest edge pixel, wherein the closest edge pixel is located adjacent to the group of pixels, wherein the closest edge pixel has a shortest distance to said at least one of the two pixels among edge pixels of the group of pixels.

The receiving device 110, the processing module 801 and/or the identifying module 860, or another identifying module (not shown), may be configured for identifying a further group of pixels among pixels of the picture, wherein the further group of pixels comprises two further pixels, wherein the two further pixels are adjacent to each other along a further direction of the picture, wherein pixel values of the further group of pixels are equal to each other.

The receiving device 110, the processing module 801 and/or the estimating module 880, or another estimating module (not shown), may be configured for, for at least one of the two further pixels, estimating a respective further estimated pixel value based on a third pixel value and a fourth pixel value, wherein the third and fourth pixel values are derived from two further edge pixel values of two further edge pixels, wherein each one of the two further edge pixels is located along the further direction, and wherein each one of the further two edge pixels is located adjacent to a respective end of the further group of pixels with respect to the further direction.

The receiving device 110, the processing module 801 and/or the determining module 893 may be configured for, for each pixel of the picture, determining a respective weighted pixel value based on a weighted average over the respective estimated pixel values and the respective further estimated pixel values.

The receiving device 110, the processing module 801 and/or the decoding module 830 may be configured for decoding the picture from a bitstream.

In some embodiments, the estimation is part of a procedure for managing banding artefact. In these embodiments, the receiving device 110, the processing module 801 and/or the receiving module 820 may be configured for receiving, from a sending device 120, a message indicating whether or not to perform the procedure for managing banding artefacts.

The receiving device 110, the processing module 801 and/or the assigning module 896 may be configured for, for each one of the two pixels, assigning the respective estimated pixel value to said each one of the two pixels.

The receiving device 110, the processing module 801 and/or the assigning module 896, or another assigning module (not shown), may be configured for assigning by, for each one of the two pixels, assigning the respective weighted pixel value to said each one of the two pixels.

As mentioned, in some embodiments, the group of pixels is one of a plurality of groups of pixels, wherein the plurality of groups of pixels define a gradient, along the direction, with respect to respective converted pixel values of each group of pixels, wherein all pixels of the plurality of groups are consecutive along the direction.

In some embodiments, a difference in converted pixel values between two adjacent groups of pixels corresponds to only one level in accordance with the first bitdepth.

In some embodiments, the weighted average is based on distance from said each pixel to at least one of the two edge pixels and the two further edge pixels.

In some embodiments, the direction and the further direction are orthogonal to each other.

In some embodiments, the first bitdepth is indicative of a first number of bits used for representing pixel values of the pixels.

In some embodiments, a second number of bits used for representing converted pixel values of the pixels is greater than the first number.

In some embodiments, the direction refers to one of rows of the picture, columns of the picture and pixels along a line at an angle with respect to a rows or columns of the picture.

In some embodiments, the procedure for managing banding artefacts is performed based on the message.

In some embodiments, the message is a SEI message, or signalled in SPS, PPS or VUI.

In some embodiments, the picture is comprised in a video sequence.

In some embodiments, the video sequence is a High Dynamic Range (HDR) video.

Figure 9:
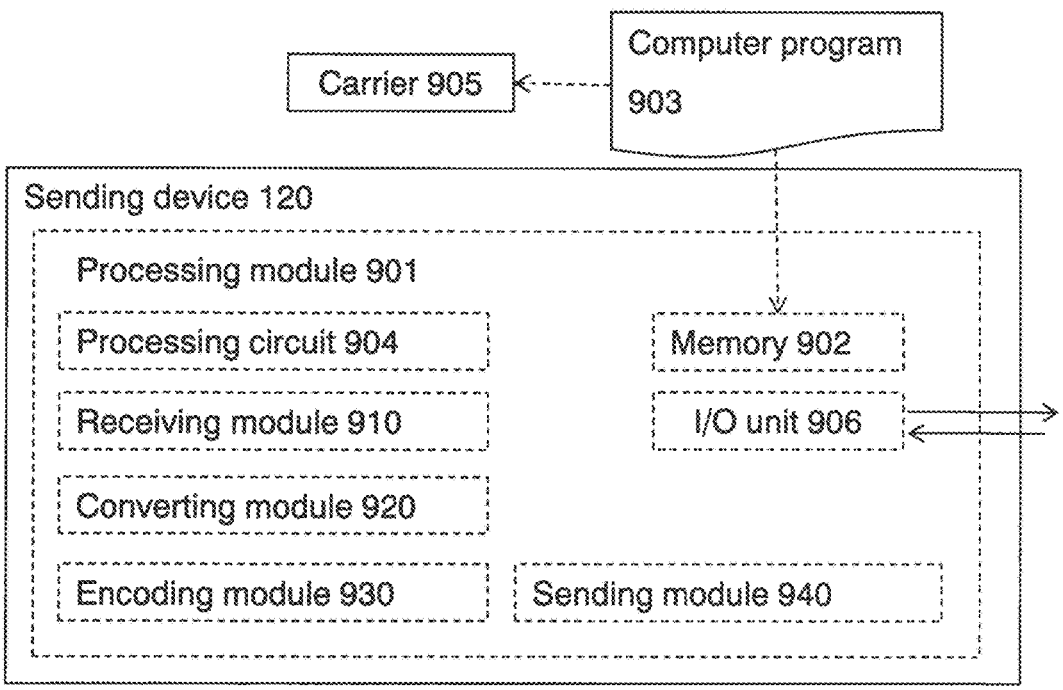
FIG. 9 illustrates a schematic block diagram of a sending device, according to the embodiments of the present invention.

With reference to FIG. 9, a schematic block diagram of embodiments of the sending device 120 of FIG. 2 is shown.

The sending device 120 may comprise a processing module 901, such as a means, one or more hardware modules and/or one or more software modules for performing the methods described herein.

The sending device 120 may further comprise a memory 902. The memory may comprise, such as contain or store, a computer program 903.

According to some embodiments herein, the processing module 901 comprises, e.g. 'is embodied in the form of' or 'realized by', a processing circuit 904 as an exemplifying hardware module. In these embodiments, the memory 902 may comprise the computer program 903, comprising computer readable code units executable by the processing circuit 904, whereby the sending device 120 is operative to perform the methods of FIG. 3.

In some other embodiments, the computer readable code units may cause the sending device 120 to perform the method according to FIG. 3 when the computer readable code units are executed by the sending device 120.

FIG. 9 further illustrates a carrier 905, or program carrier, which comprises the computer program 903 as described directly above.

In some embodiments, the processing module 901 comprises an Input/Output unit 906, which may be exemplified by a receiving module and/or a sending module as described below when applicable.

In further embodiments, the processing module 901 may comprise one or more of a receiving module 910, a converting module 920, an encoding module 930, a sending module 940 as exemplifying hardware modules. In other examples, one or more of the aforementioned exemplifying hardware modules may be implemented as one or more software modules.

Accordingly, the sending device 120 is configured for encoding a picture into a bitstream, wherein the picture comprises pixels.

The sending device 120, the processing module 901 and/or the converting module 920 is configured for converting pixel values of the pixels represented with a second bitdepth to pixel values of the pixels represented with a first bitdepth, wherein the first bitdepth is smaller than the second bitdepth.

Furthermore, the sending device 120, the processing module 901 and/or the encoding module 930 is configured for encoding the picture with the pixel values of the pixels represented with the first bitdepth into the bitstream.

Moreover, the sending device 120, the processing module 901 and/or the encoding module 930, or another encoding module (not shown), is configured for encoding a message into the bitstream, wherein the message indicates whether or not to perform, by a device receiving the bitstream, a procedure for managing banding artefacts.

The sending device 120, the processing module 901 and/or the sending module 940 may be configured for sending the bitstream to the receiving device 110, wherein the receiving device 110 is configured for performing the procedure for managing banding artefacts based on the message.

The sending device 120, the processing module 901 and/or the receiving module 910 may be configured for receiving, from the receiving device 110, a capability message indicating that the receiving device 110 is capable of performing the procedure for managing banding artefacts.

As mentioned, in some embodiments, the message is a SEI message or signalled in SPS, PPS or VUI.

In some embodiments, the capability message is an RTSP, SDP or HTTP request message.

Figure 10:
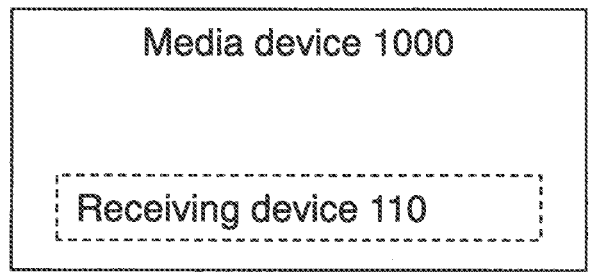
FIG. 10 illustrates a block diagram of a media device comprising the receiving device.

FIG. 10 is a block diagram, illustrating that the receiving device 110, such as when realized as a decoder, may be comprised in a media device 1000. That is to say, the media device 1000 may comprise the receiving device 110 according to the embodiments herein.

Figure 11:
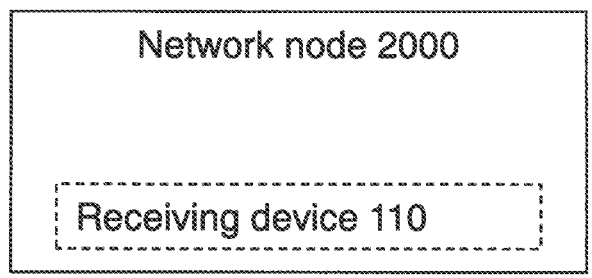
FIG. 11 illustrates a block diagram of a network node comprising the receiving device.

FIG. 11 is a block diagram, illustrating that the receiving device 110, such as when realized as a decoder, may be comprised in a network node 2000. That is to say, the network node 2000 may comprise the receiving device 110 according to the embodiments herein.

Figure 12:
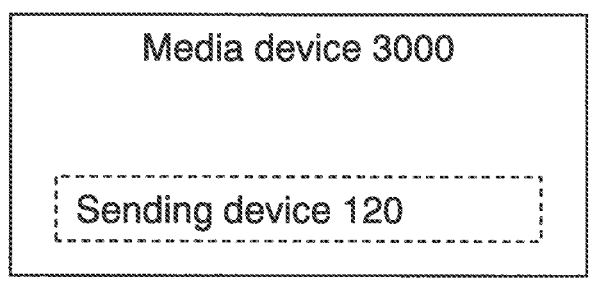
FIG. 12 illustrates a block diagram of a media device comprising the sending device.

FIG. 12 is a block diagram, illustrating that the sending device 120, such as when realized as an encoder, may be comprised in a media device 3000. That is to say, the media device 3000 may comprise the sending device 120 according to the embodiments herein.

Figure 13:
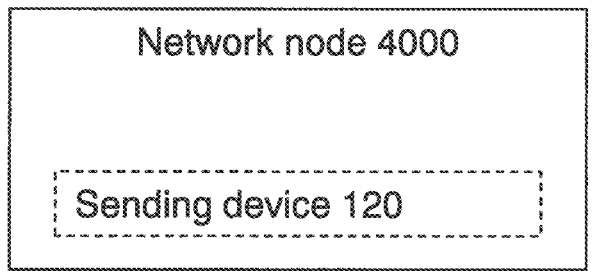
FIG. 13 illustrates a block diagram of a network node comprising the sending device.

FIG. 13 is a block diagram, illustrating that the sending device 120, such as when realized as an encoder, may be comprised in a network node 4000. That is to say, the network node 4000 may comprise the sending device 120 according to the embodiments herein.

As used herein, the term "media device" may refer to a video recorder, a video camera, a cellular phone, a television set top box, etc.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "hardware module" may refer to an electronic circuit comprising various components, one or more electronic components, such as a Digital Signal Processor (DSP), an Application Specific integrated Circuit (ASIC), a portion of an electronic component, e.g. realized from Hardware Description Language (HDL), or the like.

As used herein, the terms "encoder" and/or "decoder" may be realized as one or more software modules, hardware module or a combination thereof.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "action" may refer to an action, a step, an operation, a response, a reaction, an activity or the like.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a receiving device, for managing a picture, wherein the picture comprises pixels, wherein pixel values of the pixels are represented with a first bitdepth, the method comprising:
   converting the pixel values of the pixels represented with the first bitdepth into pixel values represented with a second bitdepth, wherein the first bitdepth is smaller than the second bitdepth;
   identifying a first group of pixels among the pixels of the picture, wherein the first group of pixels comprises a first pixel and a second pixel adjacent to the first pixel along a first direction, wherein pixel values of the first pixel and the second pixel are equal;
   identifying a first edge pixel, wherein the first edge pixel is adjacent to a first end of the first group of pixels along the first direction;
   identifying a second edge pixel, wherein the second edge pixel is adjacent to a second end of the first group of pixels along the first direction, and wherein the second end is opposite of the first end;
   deriving a first pixel value based on the edge pixel values of the first edge pixel and the second edge pixel;

deriving a second pixel value based on the edge pixel values of the first edge pixel and the second edge pixel; and estimating a first estimated pixel value for the first pixel based on the derived first pixel value and the derived second pixel value.

2. The method according to claim 1, wherein the first group of pixels is one of a plurality of groups of pixels, wherein the plurality of groups of pixels define a gradient, along the first direction, with respect to respective converted pixel values of each group of pixels, wherein all pixels of the plurality of groups are consecutive along the first direction.

3. The method according to claim 2, wherein a difference in converted pixel values between two adjacent groups of pixels corresponds to one level in accordance with the first bitdepth.

4. The method according to claim 1, wherein the method comprises:

deriving the first and second pixel values from the two edge pixel values by setting the first and second pixel values in a range defined by the two edge pixel values, wherein a difference between the first and second pixel values is one level in accordance with the first bitdepth.

5. The method according to claim 1, wherein the method comprises:

selecting the first direction based on distance to a closest edge pixel, wherein one of the two edge pixels is the closest edge pixel, wherein the closest edge pixel is located adjacent to the group of pixels, wherein the closest edge pixel has a shortest distance to said at least one of the two pixels of the first group of pixels.

6. The method according to claim 1, wherein the method comprises:

identifying a further group of pixels among pixels of the picture, wherein the further group of pixels comprises two further pixels, wherein the two further pixels are adjacent to each other along a further direction, wherein pixel values of the further group of pixels are equal to each other, for at least one of the two further pixels, estimating a respective further estimated pixel value based on a third pixel value and a fourth pixel value, wherein the third and fourth pixel values are derived from two further edge pixel values of two further edge pixels, wherein each one of the two further edge pixels is located along the further direction, and wherein each one of the further two edge pixels is located adjacent to a respective end of the further group of pixels with respect to the further direction, and for each pixel of the picture, determining a respective weighted pixel value based on a weighted average over the respective estimated pixel values and the respective further estimated pixel values.

7. The method according to claim 6, wherein the weighted average is based on distance from said each pixel to at least one of the two edge pixels and the two further edge pixels.

8. The method according to claim 6, wherein the first direction and the further direction are orthogonal to each other.

9. The method according to claim 1, wherein the first direction refers to one of rows of the picture, columns of the picture and pixels along a line at an angle with respect to rows or columns of the picture.

10. The method according to claim 1, wherein the method comprises:

decoding the picture from a bitstream.

11. The method according to claim 1, wherein the estimation is part of a procedure for managing banding artefact, wherein the method comprises:

receiving, from a sending device, a message indicating whether or not to perform the procedure for managing banding artefacts.

12. The method according to claim 11, wherein the message is a SEI message, or signalled in SPS, PPS or VUI.

13. The method according to claim 1, wherein the picture is comprised in a video sequence.

14. The method according to claim 13, wherein the video sequence is a High Dynamic Range (HDR) video.

15. The method according to claim 1, wherein the method comprises:

estimating a second pixel value for the second pixel based on the derived first pixel value and the derived second pixel value; and assigning the first estimated pixel value to the first pixel and assigning the second estimated pixel value to the second pixel.

16. The method according to claim 15, wherein assigning the first estimated pixel value comprises assigning a first weighted pixel value to the first pixel, and wherein assigning the second estimated pixel value comprises assigning a second weighted pixel value to the second pixel.

17. A receiving device comprising:

a memory storing pixels of a picture, wherein pixel values of the pixels are represented with a first bitdepth;

processing circuity coupled to the memory, the processing circuitry configured to:

convert the pixel values of the pixels represented with the first bitdepth into pixel values of the pixels represented with a second bitdepth, wherein the first bitdepth is smaller than the second bitdepth;

identify a first group of pixels among the pixels of the picture, wherein the first group of pixels comprises a first pixel and a second pixel adjacent to the first pixel along a first direction, wherein pixel values of the first pixel and the second pixel are equal;

identify a first edge pixel, wherein the first edge pixel is adjacent to a first end of the first group of pixels along the first direction;

identify a second edge pixel, wherein the second edge pixel is adjacent to a second end of the first group of pixels along the first direction, and wherein the second end is opposite of the first end;

derive a first pixel value based on the edge pixel values of the first edge pixel and the second edge pixel;

derive a second pixel value based on the edge pixel values of the first edge pixel and the second edge pixel; and estimate a first estimated pixel value for the first pixel based on the derived first pixel value and the derived second pixel value.

18. The receiving device according to claim 17, wherein the first group of pixels is one of a plurality of groups of pixels, wherein the plurality of groups of pixels define a gradient, along the first direction, with respect to respective converted pixel values of each group of pixels, wherein all pixels of the plurality of groups are consecutive along the first direction.

19. The receiving device according to claim 17, wherein the processing circuitry is further configured to:

identifying a further group of pixels among pixels of the picture, wherein the further group of pixels comprises two further pixels, wherein the two further pixels are adjacent to each other along a further direction, wherein pixel values of the further group of pixels are equal to each other, for at least one of the two further pixels, estimating a respective further estimated pixel value based on a third pixel value and a fourth pixel value, wherein the third and fourth pixel values are derived from two further edge pixel values of two further edge pixels, wherein each one of the two further edge pixels is located along the further direction, and wherein each one of the further two edge pixels is located adjacent to a respective end of the further group of pixels with respect to the further direction, and for each pixel of the picture, determining a respective weighted pixel value based on a weighted average over the respective estimated pixel values and the respective further estimated pixel values.

20. The receiving device according to claim 17, wherein the processing circuitry is further configured to decode the picture from a bitstream.

21. The receiving device according to claim 17, wherein the estimation is part of a procedure for managing banding artefact, wherein the processing circuitry is further configured to receive, from a sending device, a message indicating whether or not to perform the procedure for managing banding artefacts.

22. The receiving device according to claim 21, wherein the message is a SEI message, or signalled in SPS, PPS or VUI.

23. The receiving device of claim 17, wherein the receiving device is comprised in a media device.

24. The receiving device of claim 17, wherein the receiving device is comprised in a network node.

25. A computer program stored on a non-transitory computer readable medium, comprising computer readable code units which when executed on a receiving device causes the receiving device to perform the method according to claim 1.

26. A carrier comprising the computer program according to claim 25, wherein the carrier is a non-transitory computer readable medium.

27. The method according to claim 1, wherein the method comprises:

identifying a second group of pixels among the pixels of the picture, wherein the second group of pixels comprises the first pixel and a third pixel adjacent to the first pixel along a second direction, wherein pixel values of the first pixel and the third pixel are equal;

identifying a third edge pixel, wherein the third edge pixel is adjacent to a first end of the second group of pixels along the second direction;

identifying a fourth edge pixel, wherein the fourth edge pixel is adjacent to a second end of the second group of pixels along the second direction, and wherein the second end of the second group of pixels is opposite of the first end of the second group of pixels;

deriving a third pixel value based on the edge pixel values of the third edge pixel and the fourth edge pixel; and deriving a fourth pixel value based on the edge pixel values of the third edge pixel and the fourth edge pixel, wherein estimating the first estimated pixel value for the first pixel comprises estimating the first estimated pixel value for the first pixel based on the derived first pixel value, the derived second pixel value, the derived third pixel value, and the derived third fourth value.

* * * * *